No. 760,173. PATENTED MAY 17, 1904.
A. W. BALL.
PROCESS OF CURING AND PRESERVING MEATS.
APPLICATION FILED JUNE 24, 1903.
NO MODEL.
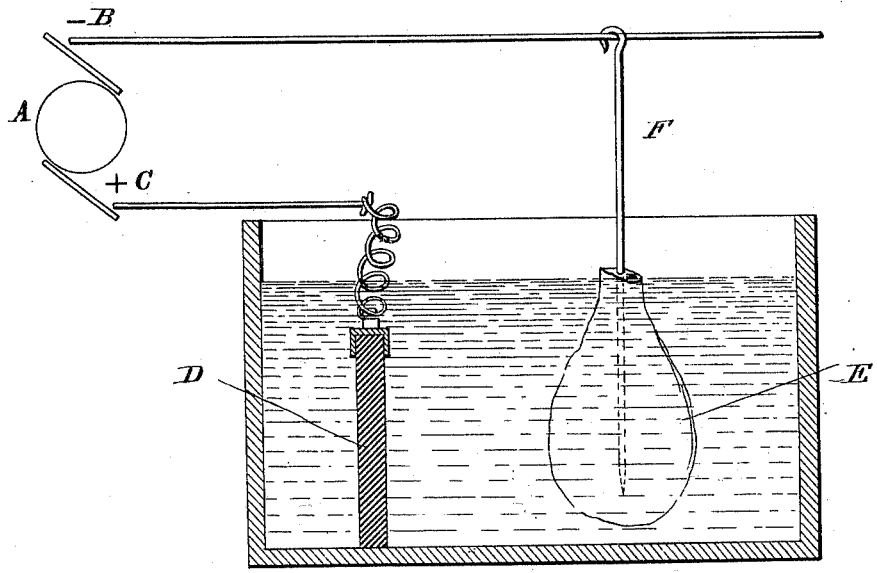
WITNESSES
Edwin L. Yewell
R. H. Bishop
INVENTOR
Augustus William Ball,
By Davis & Davis,
Attorneys.

No. 760,173.

Patented May 17, 1904.

UNITED STATES PATENT OFFICE.

AUGUSTUS WILLIAM BALL, OF RICHMOND, VIRGINIA, ASSIGNOR OF THREE-FOURTHS TO GEORGE ARMS TOWER, HUGH ARCHIBALD McCURDY, AND FRANK LEE JOBSON, OF RICHMOND, VIRGINIA.

PROCESS OF CURING AND PRESERVING MEATS.

SPECIFICATION forming part of Letters Patent No. 760,173, dated May 17, 1904.

Application filed June 24, 1903. Serial No. 162,823. (No specimens.)

*To all whom it may concern:*

Be it known that I, AUGUSTUS WILLIAM BALL, a citizen of the United States of America, residing at Richmond, in the county of Henrico and State of Virginia, have invented a certain new and useful Process of Curing and Preserving Meats and other Perishable Foods, of which the following is a full, clear, and exact specification.

In the accompanying drawing is represented a vertical sectional view of a simple form of apparatus for carrying the process into effect.

This invention has relation to the well-known process of preserving and curing meats which consists in immersing the meat in a brine and saltpeter or other preservative solution until the meat is thoroughly permeated with the preserving and curing ingredients; and it has for its object to greatly shorten the period of immersion and at the same time more thoroughly cure and preserve the meat. As this process is ordinarily practiced it usually requires from thirty to forty days to cure the meat; but in practicing my improved process I have discovered that this time can be shortened to from ten to fifteen hours or more, according to the conditions, as more fully hereinafter set forth.

This improved process consists, essentially, in employing an electric current in such manner that the preservative solution shall constitute an electrolytic bath and the article to be cured shall constitute, in effect, the cathode, so that the bath shall be subjected to the decomposing action of the current and the entire current caused to pass throughout all parts of the meat, thereby causing the preservative ingredients to be thoroughly and uniformly deposited throughout the mass of meat.

One arrangement for carrying out my process is shown in the annexed drawing.

In the drawing, A is the generator of the electric current.

B is the negative conductor or lead from the generator. C is the positive conductor or lead.

D is the carbon or other positive conducting-plate immersed in the bath and constituting the anode.

E is the ham, shoulder, or other piece of meat immersed in the solution and attached to a metallic rod F, removably depending from the negative conductor and constituting the cathode. In practice the meat-holding rod is stuck into the piece of meat about three-quarters of the length of the latter and approximately in its longitudinal center, and the rod will be so suspended that the meat will be, practically speaking, entirely immersed in the bath in order that to reach the rod the current will be compelled to pass through the meat. In practice I have found that a current of an extremely low voltage—say from five to ten—and an amperage of from two to four is sufficient for ordinary conditions; but it will be understood that as the voltage and amperage must necessarily vary with the varying conditions I do not desire to be limited in this respect.

It will be observed that the essential feature of my improved process lies in attaching the meat to the negative conductor in such manner that it constitutes the cathode of the electrolytic bath, the object in this being to compel the entire current to pass to and throughout the meat and not permit it to pass around the meat, as would be the case were the meat suspended between the anode and the cathode, thereby utilizing to its fullest extent the effect of the current, so that the decomposed chemicals (salt and saltpeter in the present instance) of the preservative solution shall be deposited throughout the meat, the meat being sufficiently porous or cellular to readily permit this permeation and deposition. It will be observed also that the current will have a germ-killing and decay-arresting effect, this effect being accentuated by reason of the fact that the entire current is directed through the meat. It will be observed, further, that an essential feature of this process lies in completely surrounding that part of the suspending-rod below the surface of the bath by the meat, so that the solution shall at no point come in contact with the rod (except by soaking through the meat) and permit the current to pass thereto without first passing through the meat. I therefore insure the entire current passing through the meat and not around it, as would be the case were the articles to be preserved packed or suspended in the bath between the anode and cathode. In other words, the entire current is directed upon the article and caused to pass through it.

It has not been possible for me to ascertain to an absolute scientific certainty just how the preserving ingredients are carried into the meat; but in view of the great rapidity of the impregnation which my experiments have shown I am forced to believe that the current not only opens the pores of the meat, but also actually carries the dissolved ingredients into the opened pores and deposits them after the manner usual in electrolytic processes. I have also found in practicing my method in the manner herein shown and described that impregnation is substantially uniform in depth, thus showing that the current enters the meat from all sides and not simply from the side next to the anode.

It will be understood that in the commercial operation of my process it will be an advantage to have the tank of sufficient size and the current of sufficient strength to accommodate a great number of pieces of meat, so that the process can be made practically continuous by so arranging the pieces that by the time that the attendant had finished preparing and hanging all the pieces the first ones hung would be ready to remove, thereby reducing the operative cost to a minimum.

It will be understood that by the term "food" I desire to cover fish, fats, and all other kinds of perishable food. In fact, as my process might with advantage be applied to the cure and preservation of some varieties of vegetable food, I wish it understood that I do not limit myself in respect of the kinds of food articles to be treated.

Having thus described my invention, what I claim, and desire to secure by Letters Patent, is—

The process of curing perishable food consisting in subjecting the food to the action of an electrical current while immersed in a preservative solution, the food being attached to the negative pole and interposed between it and the bath and being separated from the positive pole by the bath, whereby the food will constitute the cathode and have the entire current directed through it.

In testimony whereof I hereunto affix my signature, in the presence of two witnesses, this 20th day of June, 1903.

AUGUSTUS WILLIAM BALL.

Witnesses:
F. M. JONES,
W. J. MAY.